United States Patent
Zhao

(10) Patent No.: US 12,479,372 B2
(45) Date of Patent: Nov. 25, 2025

(54) VEHICLE TRUNK-MOUNTED BICYCLE RACK FOR FAST DISASSEMBLY, ASSEMBLY, FOLDING, AND STORAGE

(71) Applicant: WODE GLOBAL (QINGDAO) OUTDOOR CO. LTD, Qingdao (CN)

(72) Inventor: Yingchun Zhao, Qingdao (CN)

(73) Assignee: WODE GLOBAL (QINGDAO) OUTDOOR CO., LTD, Qingdao (CN)

( * ) Notice: Subject to any disclaimer, the term of this patent is extended or adjusted under 35 U.S.C. 154(b) by 249 days.

(21) Appl. No.: 18/360,753

(22) Filed: Jul. 27, 2023

(65) Prior Publication Data

US 2024/0123911 A1    Apr. 18, 2024

(30) Foreign Application Priority Data

Jul. 21, 2023  (CN) .......................... 202310903171.4

(51) Int. Cl.
*B60R 9/10* (2006.01)
*B60R 9/06* (2006.01)

(52) U.S. Cl.
CPC . *B60R 9/10* (2013.01); *B60R 9/06* (2013.01)

(58) Field of Classification Search
CPC .................................... B60R 9/06; B60R 9/10
See application file for complete search history.

(56) References Cited

U.S. PATENT DOCUMENTS

| | | | |
|---|---|---|---|
| 8,028,878 B1* | 10/2011 | Pedrini ..................... | B60R 9/06 224/924 |
| 8,573,456 B2* | 11/2013 | Farber ...................... | B60R 9/10 224/314 |
| 2002/0117524 A1* | 8/2002 | Jeong ........................ | B60R 9/06 224/532 |
| 2006/0032880 A1* | 2/2006 | Settelmayer .............. | B60R 9/10 224/924 |
| 2006/0186161 A1* | 8/2006 | Huang ...................... | B60R 9/06 224/924 |
| 2011/0068138 A1* | 3/2011 | Flaherty ................... | B60R 9/06 224/324 |
| 2012/0234883 A1* | 9/2012 | Sautter ...................... | B60R 9/10 224/502 |
| 2013/0062384 A1* | 3/2013 | Phillips ..................... | B60R 9/10 224/500 |
| 2014/0125045 A1* | 5/2014 | Nusbaum .................. | B60R 9/10 280/769 |

(Continued)

*Primary Examiner* — Brian D Nash

(74) *Attorney, Agent, or Firm* — Hawaii Patent Services; Nathaniel K. Fedde; Kenton N. Fedde

(57) ABSTRACT

The present invention discloses a vehicle trunk-mounted bicycle rack for fast disassembly, assembly, folding and storage, which includes a supporting state and a storage state; when the vehicle trunk-mounted bicycle rack is in the supporting state, the vehicle trunk-mounted bicycle rack is supported on a trunk of a car; and when the vehicle trunk-mounted bicycle rack is in the storage state, the vehicle trunk-mounted bicycle rack is removed from a trunk of a car and stored in the trunk of the car. Embodiments of the present invention provide a vehicle trunk-mounted bicycle rack for fast disassembly, assembly, folding and storage, which can be quickly stored or supported, and be suitable for vehicles with different models, such as sedans, SUVs or MPVs.

8 Claims, 4 Drawing Sheets

(56) References Cited

U.S. PATENT DOCUMENTS

| | | | | |
|---|---|---|---|---|
| 2016/0001710 A1* | 1/2016 | Prescott | ................... | B60R 9/06 |
| | | | | 224/536 |
| 2016/0185304 A1* | 6/2016 | Pedrini | .................... | B60R 9/10 |
| | | | | 224/572 |
| 2016/0229350 A1* | 8/2016 | Ziv | .......................... | B60R 9/10 |
| 2016/0355140 A1* | 12/2016 | Condon | ................... | B60R 9/06 |
| 2021/0101538 A1* | 4/2021 | Gaddis | ...................... | B60R 9/10 |

* cited by examiner

VEHICLE TRUNK-MOUNTED BICYCLE RACK FOR FAST DISASSEMBLY, ASSEMBLY, FOLDING, AND STORAGE

CROSS-REFERENCE TO RELATED APPLICATIONS

This application claims priority to Chinese Application No. 2023109031714 filed on Jul. 21, 2023 the contents of which are hereby incorporated by reference in their entirety.

TECHNICAL FIELD

The present invention relates to the field of vehicle-mounted bicycle rack products, and in particular to a vehicle trunk-mounted bicycle rack for fast disassembly, assembly, folding and storage.

BACKGROUND ART

With the improvement of people's living standards, many families often bring sports equipment such as bicycles when they travel or exercise by cars. Due to the limited space in the interior of the car or the trunk, the bicycle can only be fixed on the rear of the car, that is, it is fixed on the outside of the trunk of the car. Generally, the bicycle is fixed on a vehicle-mounted bicycle rack, and the vehicle-mounted bicycle rack is then fixed on the outside of the car trunk.

At present, a vehicle-mounted bicycle rack is relatively fixed, and the support angle of the rack cannot be adjusted, such that the rack can only be applied to cars with the same or similar models, and it is difficult to be universal for different car models. For example, there is a significant difference in the structures of the vehicle-mounted bicycle racks applicable to sedans and SUV models, and it is not possible to adapt to different forms of cars by adjusting the angles of the vehicle-mounted bicycle racks.

In order to solve the above problems, there is an urgent need to invent a vehicle trunk-mounted bicycle rack for fast disassembly, assembly, folding and storage, so as to solve the problems of rapid folding and storage of the vehicle-mounted bicycle rack and adjustment of the support angle.

SUMMARY OF THE INVENTION

In view of the above-mentioned technical problems, embodiments of the present invention provide a vehicle trunk-mounted bicycle rack for fast disassembly, assembly, folding and storage, which can be quickly disassembled and folded and the support angle of which can be adjusted to adapt to different car models, such as sedans or SUVs or MPVs or other car models.

A first aspect of the embodiments of the present invention provides a vehicle trunk-mounted bicycle rack for fast disassembly, assembly, folding and storage, wherein:
the vehicle trunk-mounted bicycle rack comprises a supporting state and a storage state; when the vehicle trunk-mounted bicycle rack is in the supporting state, the vehicle trunk-mounted bicycle rack is supported on a trunk of a car; and
when the vehicle trunk-mounted bicycle rack is in the storage state, the vehicle trunk-mounted bicycle rack is removed from a trunk of a car and stored in the trunk of the car.

A vehicle trunk-mounted bicycle rack for fast disassembly, assembly, folding and storage according to the present invention, wherein the vehicle trunk-mounted bicycle rack comprises:
a horizontal bracket which is used for holding a bicycle; and
an adjustment bracket which realizes the supporting state or the storage state of the vehicle trunk-mounted bicycle rack by adjusting the angle between the adjustment bracket and the horizontal bracket.

A vehicle trunk-mounted bicycle rack for fast disassembly, assembly, folding and storage according to the present invention, wherein the vehicle trunk-mounted bicycle rack further comprises bicycle beam fixing pieces which are used for fixing and carrying a bicycle beam, there are multiple bicycle beam fixing pieces, and the bicycle beam fixing pieces are arranged on the horizontal bracket.

A vehicle trunk-mounted bicycle rack for fast disassembly, assembly, folding, and storage according to the present invention, wherein the adjustment bracket comprises connectors connected to the horizontal bracket, a first U-shaped support bracket and a second U-shaped support bracket;
the connectors are fixed to the horizontal bracket through first pin shafts, the first U-shaped support bracket is connected to the connectors through rotary shafts, and the first U-shaped support bracket can rotate around the rotary shafts;
the second U-shaped support bracket is hinged with the first U-shaped support bracket; and
when the vehicle trunk-mounted bicycle rack is in the storage state, the first U-shaped support bracket is rotated through the rotary shafts to a state where the first U-shaped support bracket is parallel to the horizontal bracket, while the second U-shaped support bracket is parallel to the first U-shaped support bracket.

A vehicle trunk-mounted bicycle rack for fast disassembly, assembly, folding, and storage according to the present invention, wherein an upper portion of the first U-shaped support bracket is hinged with the connectors through supporting connectors, and the first U-shaped supporting bracket can be supported and fixed through the supporting connectors.

A vehicle trunk-mounted bicycle rack for fast disassembly, assembly, folding, and storage according to the present invention, wherein the supporting connectors are hinged with the first U-shaped support bracket through second pin shafts, and the first U-shaped support bracket can rotate around the second pin shafts;
the supporting connectors are hinged with the connectors through third pin shafts, and
the supporting connectors can rotate around the third pin shafts; and
the connector is provided with bar-shaped mounting holes for the third pin shaft, and
the third pin shaft can be slid or fixed in the bar-shaped mounting holes.

A vehicle trunk-mounted bicycle rack for fast disassembly, assembly, folding, and storage according to the present invention, wherein two supporting legs of the second U-shaped support bracket are hinged with the first U-shaped support bracket through hinges;
the hinge is provided with second hinge holes for hinge with the supporting legs of the second U-shaped support bracket, and first hinge holes for hinge with the first U-shaped support bracket, the hinge is hinged with the second U-shaped support bracket through the second hinge holes and a pin shaft, and the hinge is hinged with the first U-shaped support bracket through the first hinge holes and a pin shaft; and
the hinge is provided with arc-shaped fixing holes, the arc-shaped fixing holes are connected with the first U-shaped support bracket through a pin shaft with a locking structure, the pin shaft with the locking structure can be mounted in any position of the arc-shaped fixing holes, and the hinge can be fixed in a rotating or locking manner through the pin shaft with the locking structure.

A vehicle trunk-mounted bicycle rack for fast disassembly, assembly, folding, and storage according to the present invention, wherein the horizontal bracket comprises a horizontal portion composed of two horizontal struts in a horizontal state and a U-shaped bent portion; the horizontal portion and the U-shaped bent portion form an integral structure; and the horizontal portion is used to carry a bicycle, and the U-shaped bent portion is used for supporting on a car body.

A vehicle trunk-mounted bicycle rack for fast disassembly, assembly, folding, and storage according to the present invention, wherein parts where the horizontal bracket and the adjustment bracket are in contact with a car are provided with flexible protective sleeves.

A vehicle trunk-mounted bicycle rack for fast disassembly, assembly, folding, and storage according to the present invention, wherein both the horizontal bracket and the adjustment bracket are mounted on a car body by binding with webbing.

In the technical solutions provided by the embodiments of the present invention, a vehicle trunk-mounted bicycle rack for fast disassembly, assembly, folding and storage, compared with the prior art, can be quickly stored or supported. The first U-shaped support bracket and the second U-shaped support bracket in the vehicle-mounted bicycle rack can be respectively folded, in a hinge manner, parallel to the horizontal bracket. When in use, the first U-shaped support bracket and the second U-shaped support bracket are needed to be supported and fixed; and at the same time, with regard to the first U-shaped support bracket and the second U-shaped support bracket, the angle between the first U-shaped support bracket and the horizontal bracket and the angle between the second U-shaped support bracket and the first U-shaped support bracket can be adjusted through the bar-shaped mounting holes on the connectors and the arc-shaped fixing holes on the hinges, so as to be suitable for vehicles with different models, such as sedans, SUVs or MPVs.

1—horizontal bracket; 11—horizontal portion; 12—U-shaped bent portion; 2—adjustment bracket; 3—bicycle beam fixing piece; 21—connector; 22—first U-shaped support bracket; 23—second U-shaped support bracket; 24—first pin shaft; 25—rotary shaft; 26—supporting connector; 261—second pin shaft; 262—third pin shaft; 263—bar-shaped mounting hole; 231—hinge; 232—second hinge hole; 233—first hinge hole; 234 arc-shaped fixing hole; 4—flexible protective sleeve.

DETAILED DESCRIPTION OF EMBODIMENTS

The technical solutions in the embodiments of the present invention will be described clearly and completely below in conjunction with the accompanying drawings for the embodiments of the present invention; and obviously, the embodiments described are merely some, rather than all, of the embodiments of the present invention. On the basis of the embodiments of the present invention, all the other embodiments obtained by those skilled in the art without creative efforts shall fall within the scope of protection of the present invention.

Referring to FIGS. 1-6, in the embodiments of the present invention, with regard to an embodiment of a vehicle trunk-mounted bicycle rack for fast disassembly, assembly, folding and storage: the vehicle trunk-mounted bicycle rack includes a supporting state and a storage state.

Figure 1:
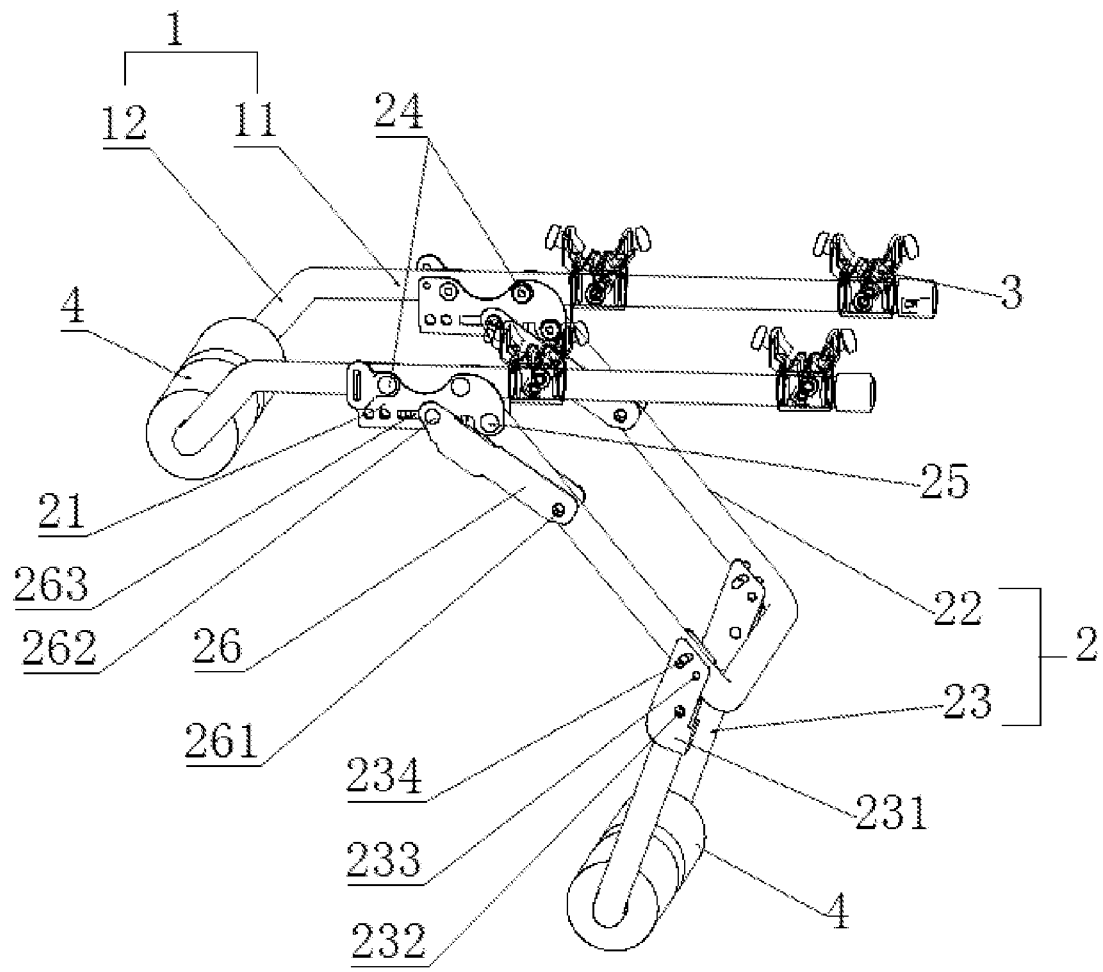
FIG. 1 is a schematic structural diagram of a vehicle trunk-mounted bicycle rack for fast disassembly, assembly, folding and storage in the embodiments of the present invention.
Figure 2:
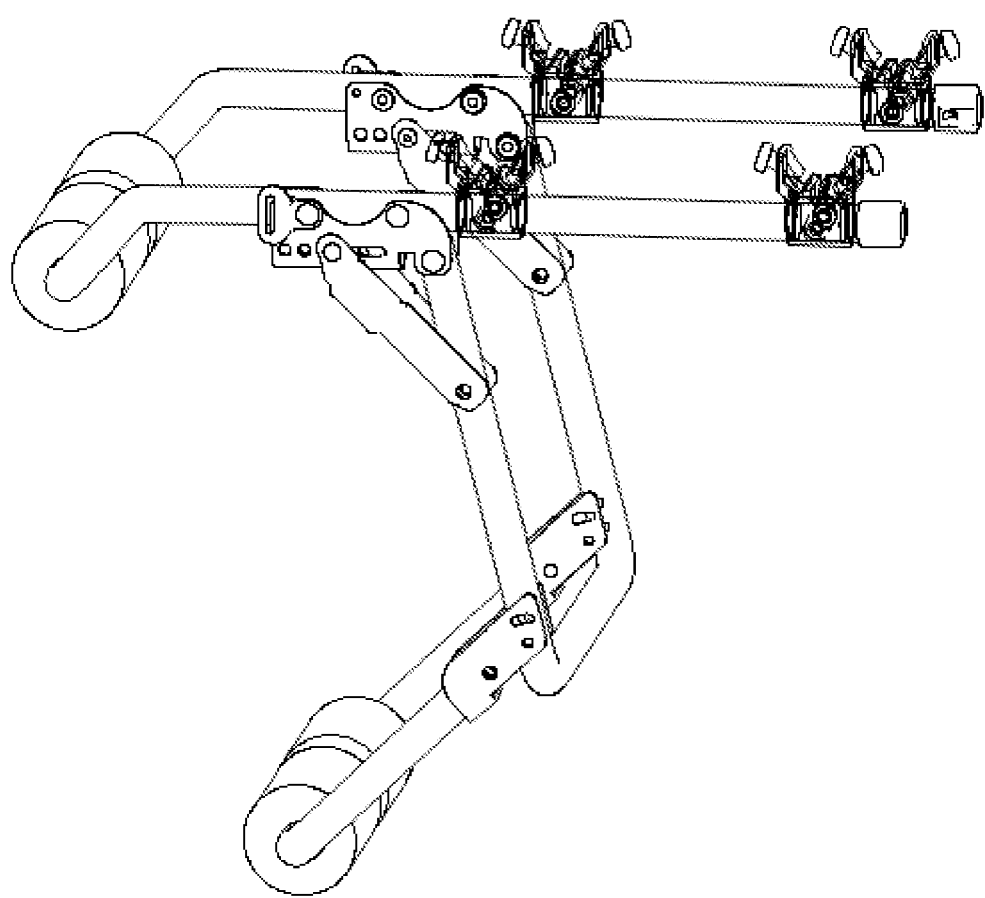
FIG. 2 is a schematic diagram of angle adjustment of a first U-shaped support bracket and a horizontal bracket in the vehicle trunk-mounted bicycle rack for fast disassembly, assembly, folding and storage in the embodiments of the present invention.

As shown in FIGS. 1 and 2, when the vehicle trunk-mounted bicycle rack is in the supporting state, the vehicle trunk-mounted bicycle rack is supported on a trunk of a car.

Figure 3:
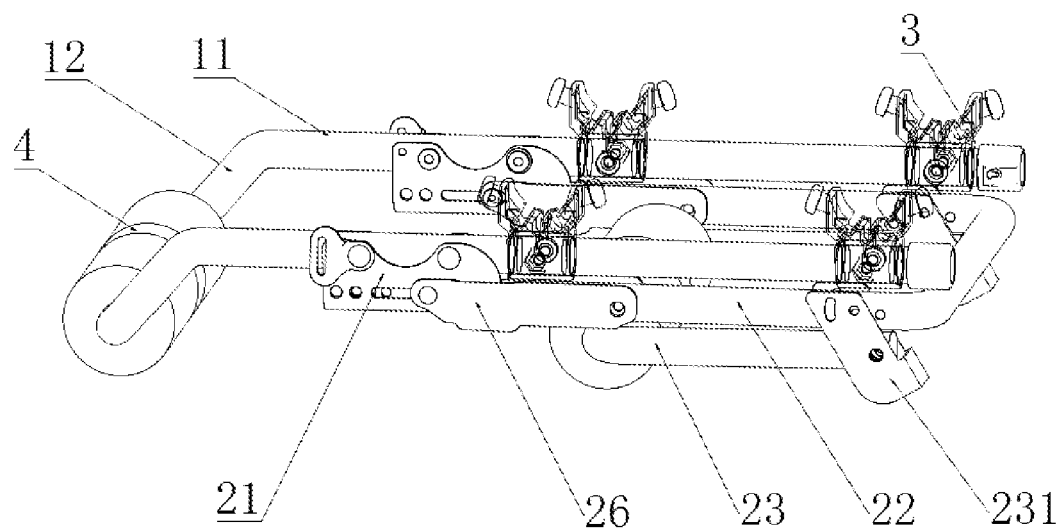
FIG. 3 is a schematic diagram of a folded structure of the vehicle trunk-mounted bicycle rack for fast disassembly, assembly, folding and storage in the embodiments of the present invention.

As shown in FIG. 3, when the vehicle trunk-mounted bicycle rack is in the storage state, the vehicle trunk-mounted bicycle rack is removed from a trunk of a car and stored in the trunk of the car.

In a specific embodiment, the vehicle trunk-mounted bicycle rack includes: as shown in FIGS. 1-3, a horizontal bracket 1 which is used for holding a bicycle; and an adjustment bracket 2 which realizes the supporting state or the storage state of the vehicle trunk-mounted bicycle rack by adjusting the angle between the adjustment bracket 2 and the horizontal bracket 1.

Figure 4:
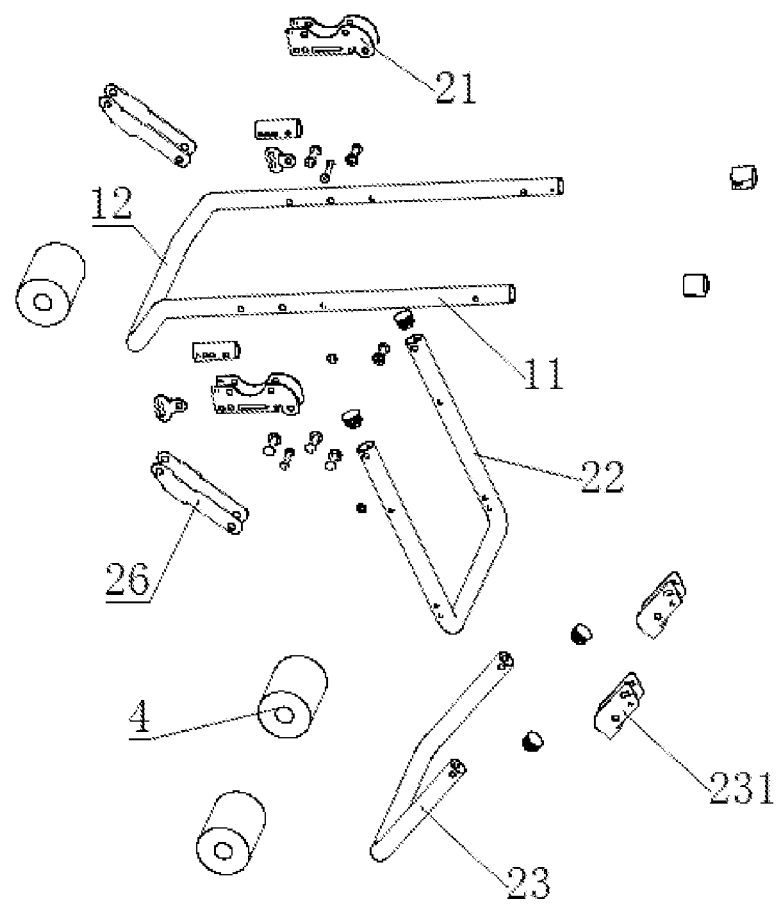
FIG. 4 is a schematic exploded diagram of the structure of the vehicle trunk-mounted bicycle rack for fast disassembly, assembly, folding and storage in the embodiments of the present invention.

In a specific embodiment, as shown in FIG. 4, the vehicle trunk-mounted bicycle rack further includes bicycle beam fixing pieces 3 which are used for fixing and carrying a bicycle beam. There are multiple, such as 4, 6, 8, and other even number of bicycle beam fixing pieces 3, and the bicycle beam fixing pieces 3 are arranged on the horizontal bracket 1. The bicycle beam fixing pieces 3 are fastened to the horizontal bracket 1 by bolts or the like, to facilitate disassembly or assembly of the bicycle beam fixing pieces 3.

In a specific embodiment, as shown in FIG. 4, the adjustment bracket 2 includes connectors 21 connected to the horizontal bracket 1, a first U-shaped support bracket 22 and a second U-shaped support bracket 23. As an example, the first U-shaped support bracket 22 and the second U-shaped support bracket 23 are formed by bending steel pipes into U-shaped structures as shown in FIG. 4, with strong load-bearing capacities and light weights.

The connectors 21 are fixed to the horizontal bracket 1 through first pin shafts 24. The first U-shaped support bracket 22 is connected to the connectors 21 through rotary shafts 25. The first U-shaped support bracket 22 can rotate around the rotary shafts 25.

The second U-shaped support bracket 23 is hinged with the first U-shaped support bracket 22.

As shown in FIG. 3, when the vehicle trunk-mounted bicycle rack is in the storage state, the first U-shaped support bracket 22 is rotated through the rotary shafts 25 to a state where the first U-shaped support bracket 22 is parallel to the horizontal bracket 1, while the second U-shaped support bracket 23 is parallel to the first U-shaped support bracket 22.

In a specific embodiment, an upper portion of the first U-shaped support bracket 22 is hinged with the connectors 21 through supporting connectors 26, and the first U-shaped supporting bracket 22 can be supported and fixed through the supporting connectors 26.

In a specific embodiment, the supporting connectors 26 are hinged with the first U-shaped support bracket 22 through second pin shafts 261, and the first U-shaped support bracket 22 can rotate around the second pin shafts 261.

The supporting connectors 26 are hinged with the connectors 21 through third pin shafts 262, and the supporting connectors 26 can rotate around the third pin shafts 262.

Figure 5:
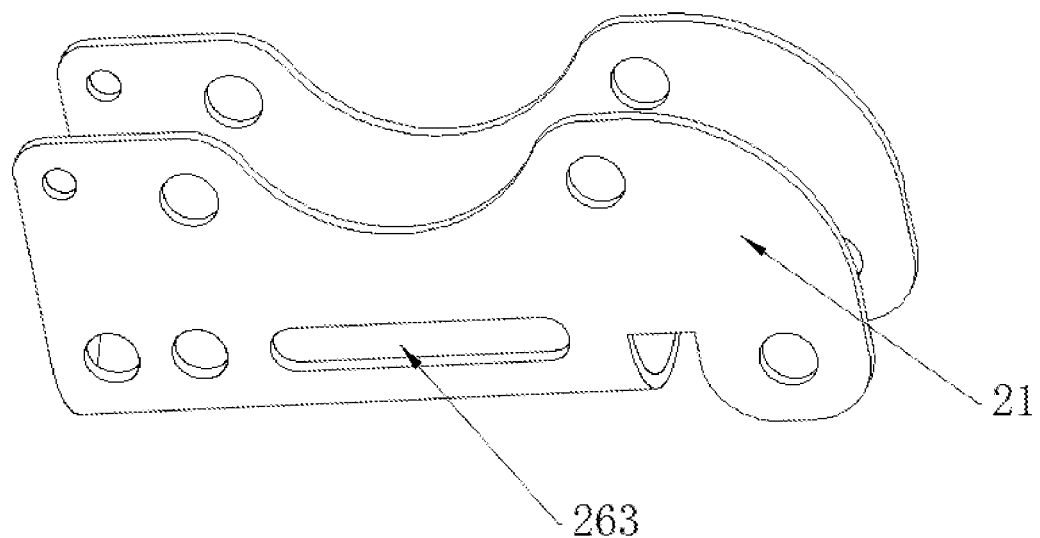
FIG. 5 is a schematic structural diagram of a connector in the vehicle trunk-mounted bicycle rack for fast disassembly, assembly, folding and storage in the embodiments of the present invention.

As shown in FIG. 5, the connector 21 is provided with bar-shaped mounting holes 263 for the third pin shaft 262, and the third pin shaft 262 can be slid or fixed in the bar-shaped mounting holes 263. For example, the other end of the third pin shaft 262 is provided with a thread, and the thread cooperates with a nut to fasten and fix the third pin shaft.

In a specific embodiment, two supporting legs of the second U-shaped support bracket 23 are hinged with the first U-shaped support bracket 22 through hinges 231.

Figure 6:
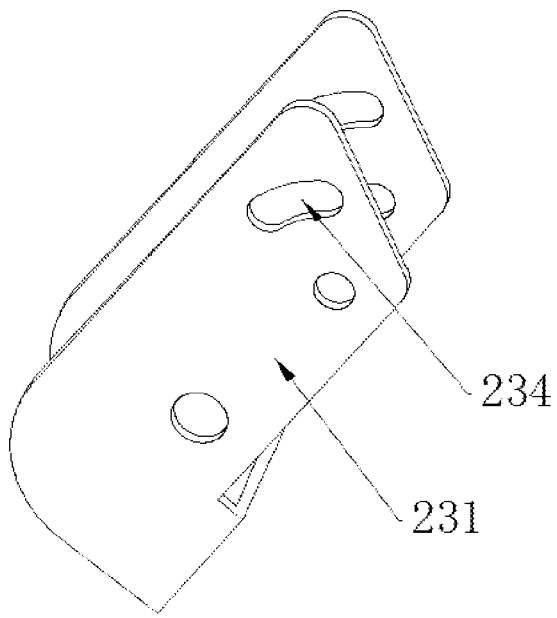
FIG. 6 is a schematic structural diagram of a hinge in the vehicle trunk-mounted bicycle rack for fast disassembly, assembly, folding and storage in the embodiments of the present invention.

As shown in FIG. 6, the hinge 231 is provided with second hinge holes 232 for hinge with the supporting legs of the second U-shaped support bracket 23, and first hinge holes 233 for hinge with the first U-shaped support bracket 22. The hinge 231 is hinged with the second U-shaped support bracket 23 through the second hinge holes 232 and a pin shaft, and the hinge 231 is hinged with the first U-shaped support bracket 22 through the first hinge holes 233 and a pin shaft.

The hinge 231 is provided with arc-shaped fixing holes 234. The arc-shaped fixing holes 234 are connected with the first U-shaped support bracket 22 through a pin shaft with a locking structure. The pin shaft with the locking structure can be mounted in any position of the arc-shaped fixing holes 234, and the hinge 231 can be fixed in a rotating or locking manner through the pin shaft with the locking structure.

In a specific embodiment, as shown in FIG. 3, the horizontal bracket 1 includes a horizontal portion 11 composed of two horizontal struts in a horizontal state and a U-shaped bent portion 12. The horizontal portion 11 and the U-shaped bent portion 12 form an integral structure. The horizontal portion is used to carry a bicycle, and the U-shaped bent portion 12 is used for supporting on a car body. As an example, after a steel pipe is bent into a U-shape, its lower portion is bent to form a U-shaped bent portion, which is beneficial for the horizontal bracket to be supported on an upper surface of a sedan trunk. At the same time, the angle between the horizontal portion and the bent portion is greater than 90 degrees, and preferably, the angle between the horizontal portion and the bent portion is greater than 120 degrees, which is beneficial for the bent portion to be supported on an inclined plane of a trunk of a vehicle of other car model, such as an SUV. The SUV trunk is different from the sedan trunk. The upper surface of a sedan trunk is a horizontal plane, while the trunk of an SUV or vehicles of other car models (such as a golf model) has an inclined plane, and the U-shaped bent portion is suitable for trunks of different car models.

In a specific embodiment, parts where the horizontal bracket 1 and the adjustment bracket 2 are in contact with a car are provided with flexible protective sleeves 4. The flexible protective sleeves 4 are made of flexible materials such as rubber sleeves or silicone sleeves. As shown in the FIGS. 1-3, bottom crossbars of the horizontal bracket and the second U-shaped support bracket are sheathed with flexible protective sleeves.

In a specific embodiment, both the horizontal bracket 1 and the adjustment bracket 2 are mounted on a car body by binding with webbing.

The above embodiments are merely used to illustrate the technical solutions of the present invention, rather than to limit them. Although the present invention has been described in detail with reference to the foregoing embodiments, those of ordinary skills in the art should understand that: the technical solutions described in the foregoing embodiments may still be modified or some technical features therein may be equivalently replaced; and these modifications or replacements do not make the essence of the corresponding technical solutions deviate from the spirit and scope of the technical solutions of the embodiments of the present invention.

The invention claimed is:

1. A vehicle trunk-mounted bicycle rack for fast disassembly, assembly, folding and storage, characterized in that: the vehicle trunk-mounted bicycle rack comprises a supporting state and a storage state;
   when the vehicle trunk-mounted bicycle rack is in the supporting state, the vehicle trunk-mounted bicycle rack is configured to be supported on a trunk of a car; and
   when the vehicle trunk-mounted bicycle rack is in the storage state, the vehicle trunk-mounted bicycle rack is configured to be stored in the trunk of the car;
   the vehicle trunk-mounted bicycle rack comprises:
   a horizontal bracket (1) configured for holding a bicycle; and
   an adjustment bracket (2) which realizes the supporting state or the storage state of the vehicle trunk-mounted bicycle rack by adjusting an angle between the adjustment bracket (2) and the horizontal bracket (1);
   the adjustment bracket (2) comprises connectors (21) connected to the horizontal bracket (1), a first U-shaped support bracket (22) and a second U-shaped support bracket (23);
   the connectors (21) are fixed to the horizontal bracket (1) through first pin shafts (24), the first U-shaped support bracket (22) is connected to the connectors (21) through rotary shafts (25), and the first U-shaped support bracket (22) is rotatable around the rotary shafts (25);
   the second U-shaped support bracket (23) is hinged with the first U-shaped support bracket (22); and
   when the vehicle trunk-mounted bicycle rack is in the storage state, the first U-shaped support bracket (22) is rotated through the rotary shafts (25) to a state where the first U-shaped support bracket (22) is parallel to the horizontal bracket (1), while the second U-shaped support bracket (23) is parallel to the first U-shaped support bracket (22).

2. The vehicle trunk-mounted bicycle rack for fast disassembly, assembly, folding and storage according to claim 1, further comprising bicycle beam fixing pieces (3) being arranged on the horizontal bracket (1) and being configured for fixing and carrying a bicycle beam.

3. The vehicle trunk-mounted bicycle rack for fast disassembly, assembly, folding, and storage according to claim 1, wherein: an upper portion of the first U-shaped support bracket (22) is hinged with the connectors (21) through supporting connectors (26), and the first U-shaped supporting bracket (22) is configured to be supported and fixed through the supporting connectors (26).

4. The vehicle trunk-mounted bicycle rack for fast disassembly, assembly, folding, and storage according to claim 3, wherein: the supporting connectors (26) are hinged with the first U-shaped support bracket (22) through second pin shafts (261), and the first U-shaped support bracket (22) is rotatable around the second pin shafts (261);

the supporting connectors (26) are hinged with the connectors (21) through third pin shafts (262), and the supporting connectors (26) are rotatable around the third pin shafts (262); and the connectors (21) are each provided with respective bar-shaped mounting holes (263) for the third pin shafts (262), and the third pin shafts (262) are configured to be slid or fixed in the bar-shaped mounting holes (263).

5. The vehicle trunk-mounted bicycle rack for fast disassembly, assembly, folding, and storage according to claim 1, wherein: two supporting legs of the second U-shaped support bracket (23) are hinged with the first U-shaped support bracket (22) through hinges (231);

each of the hinges (231) is provided with hinge holes (232) to hinge with the supporting legs of the second U-shaped support bracket (23), and further hinge holes (233) to hinge with the first U-shaped support bracket (22), each of the hinges (231) is hinged with the second U-shaped support bracket (23) through the hinge holes (232) and a second pin shaft, and each of the hinges (231) is hinged with the first U-shaped support bracket (22) through the further hinge holes (233) and a third pin shaft; and each of the hinges (231) is provided with arc-shaped fixing holes (234), the arc-shaped fixing holes (234) are connected with the first U-shaped support bracket (22) through a pin shaft with a locking structure, the pin shaft with the locking structure is configured to be mounted in any position of the arc-shaped fixing holes (234), and each of the hinges (231) is configured to be fixed in a rotating or locking manner through the pin shaft with the locking structure.

6. The vehicle trunk-mounted bicycle rack for fast disassembly, assembly, folding, and storage according to claim 1, wherein: the horizontal bracket (1) comprises a horizontal portion (11) composed of two horizontal struts in a horizontal state and a U-shaped bent portion (12); the horizontal portion (11) and the U-shaped bent portion (12) form an integral structure; and the horizontal portion is configured to carry a bicycle, and the U-shaped bent portion (12) is configured to be supported on a car body.

7. The vehicle trunk-mounted bicycle rack for fast disassembly, assembly, folding, and storage according to claim 1, wherein: parts of the horizontal bracket (1) and the adjustment bracket (2) to be in contact with a car are provided with flexible protective sleeves (4).

8. The vehicle trunk-mounted bicycle rack for fast disassembly, assembly, folding, and storage according to claim 1, wherein: both the horizontal bracket (1) and the adjustment bracket (2) are configured to be mounted on a car body by binding with webbing.

* * * * *